Sept. 19, 1972  A. J. BAUMAN  3,692,669

METHOD AND APPARATUS FOR MICRO DRY COLUMN CHROMATOGRAPHY

Filed Aug. 10, 1970

*INVENTOR.*
ALBERT J. BAUMAN

BY

*Lindenberg, Freilich & Wasserman*

ATTORNEYS.

3,692,669
METHOD AND APPARATUS FOR MICRO DRY COLUMN CHROMATOGRAPHY

Albert J. Bauman, Sierra Madre, Calif., assignor to California Institute of Technology, Pasadena, Calif.
Filed Aug. 10, 1970, Ser. No. 62,366
Int. Cl. B01d 15/08
U.S. Cl. 210—31
13 Claims

ABSTRACT OF THE DISCLOSURE

Micro-sized dry chromatographic columns are prepared by plugging at least one end of a glass capillary tube with a material impervious to the particles of adsorbent but, pervious to the chromatographic solvent, filling the tube with adsorbent, compacting the adsorbent and plugging the other end of the column. An analysis is conducted by imbibing sample onto the solvent pervious plug, solvent development through said plug, separating the bands by breaking the tube into segments and analyzing the bands.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

(1) Field of the invention

The present invention relates to analysis of micro-sized samples and more particularly, to the preparation of micro-sized dry-chromatography sampling columns and their use in the separation and analysis of micro-sized samples.

(2) Description of the prior art

Constituents of micro-sized solution are generally analyzed by thin-layer chromatography (TLC). The time required for preparing the materials for analysis are unduly extended and this technique is not amenable to field use. A scraping-elution step is necessary for recovery of TLC bands and labile compounds have a tendency to oxidize and be altered during recovery.

SUMMARY OF THE INVENTION

In accordance with the invention, a rapid and convenient technique for preparation and analysis of micro-sized dry chromatographic columns is provided. Analysis of samples by the technique of this invention minimizes both the time required for preparation of the sample and the time required for analysis. The micro-columns of this invention can be broken into separated peak segments following development and each peak can then be studied by a variety of techniques. For example, a given peak segment can be examined by mass spectrometry prior to, or following derivativization. It can also be subjected to gas chromatography, pyrolysis-TLC, or other combined techniques. The very fast preparation and development, time and ease of handling these micro-columns minimizes oxidative alteration of labile compounds. The technique provided according to the invention will permit fast analysis of soluble mixtures and will find application in chemical, biological, criminological and industrial analysis.

The invention is based on a technique for rapidly fabricating dry chromatographic micro-columns in batches from readily available storable starting materials. The analysis procedure is not critical due to the short time and convenience in repeating the steps, if necessary. An important feature contributing to speed is the small size of the columns which allows capillary attraction and separation along the length of the column in a period of, for eaxmple, 3 to 15 minutes, depending on the solvent system used. In contrast, thin-layer chromatography requires 30 minutes to 4 hours for development.

The micro-columns in accordance with the invention are more convenient to utilize and store than thin-layer chromatographic materials. Furthermore, since both the dry chromatographic column (DCC) of the invention and TLC utilize a dry adsorbent, the extensive data relating to separation by TLC is directly applicable to the micro-column technique of the invention. The micro-columns may be reduced to a very small size, limited only by the detectivity of the detection system used to characterize peaks. Thus, the micro-columns can possibly be used to resolve the constituents of single cells or organelles.

These and many other attendant advantages of the invention will become apparent as the invention becomes

BRIEF DESCRIPTION OF THE DRAWINGS description when considered in conjunction with the accompanying drawings.

DESCRIPTION OF THE PREFERRED EMBODIMENTS

Figure 1:
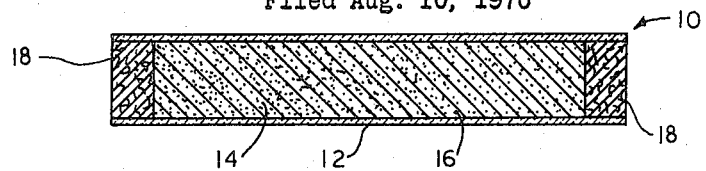
FIG. 1 is a cross-sectional view of a micro-column according to the invention.

Referring now to FIG. 1, the microcolumn 10 of the invention comprises a tubular member 12 filled with a compacted, void-free column 14 of particles 16 of dry chromatographic adsorbent and having at least one end closed with a plug 18 of material, impermeable to the particles 12 of the adsorbent and permeable to liquid. The tubular member 12 contains a bore which may be of circular, rectangular, polygonal or other configuration. Preferably, the bore is a uniformly cross-sectional circular shape so that the volume capacity may be calibrated by length. Lengths of differently sized cross-sections may be joined together for separations in which a particular component predominates.

The tubular member 12 is preferably formed of a transparent frangible material such as glass so that voids in the column are readily detected and separation bands are rendered visible in certain cases. The bands may be readily segregated by notching and breaking the glass member.

The micro-columns have an internal volume between the plugs 18 sufficient to adsorb and separate into bands samples in the milligram to microgram range. For a 100 microgram sample, the column has an internal diameter below about 5 mm. The length of the column is considerably larger than the diameter, for convenience in manufacturing and manipulating the columns during use and so that the column presents a considerable length for migration and separation of the constituents of the sample. The ratio of length (L) to internal diameter (ID) is at least 10:1 and preferably above about 20:1. At L:ID ratio above about 500:1, the column diameter is unnecessarily small; the length unnecessarily extended and the opening becomes too small for convenient filling.

The outer tubular member 12 is conveniently formed from glass capillary tubing having a diameter selected for the volume requirement of the microcolumn. Commercially available micropipettes are readily adapted to fabricating columns according to the invention. The micropipettes are available in several suitable diameters and have uniformly sized and smooth bores. A typical 25 $\mu$l. size is better understood by reference to the following detailed convenient to handle, is 45 mm. long and has a 0.940 mm. O.D. and a 0.698 mm. I.D. A typical 1 $\mu$l. size of micropipette is about 31.7 mm. long and 0.588 mm. O.D. by 0.191 I.D. This and smaller sizes can be readily packed with adsorbent to form micro-columns but are inconvenient to handle without a micromanipulator.

The porous plug 18 may be formed of many materials that are impervious to the adsorbent but are readily penetrated by the solution of sample. Suitably, the plug 18 is formed of a soft felted sheet of ceramic fibers such as "Fiberfrax" sheet by boring a plug from the sheet with the micropipette. A commercial felted ceramic fiber material is Fiberfrax 970–FH (Carborundum Co.) and comprises 1 mm. thick ceramic paper.

The particles 16 of adsorbent forming the column 14 preferably have an average diameter substantially smaller than the I.D. of the tubular member 12, preferably in a ratio of about 1:100 or less than said I.D. The particles are preferably in a finely ground state having a narrow size range varying about 25 microns from said average diameter. The particles may be purchased in this condition such as —325 mesh activated silicic acid (Unisil, manufactured by Clarkson Chemical Company), or may be ground and sieved to the desired range preliminary to filling the columns. Grinding is preferably carried out in an inert triboelectric organic liquid to prevent electrostatic charging of the particles.

The adsorbents that are useful in preparing micro-columns of this invention are generally the same adsorbents utilized in the practice of thin-layer chromatography. Organic materials such as Teflon (polytetrafluoroethylene) particles or inorganic materials such as salts or oxides can be utilized; though inorganic materials, especially the silicates, are found to provide more efficient and definitive separations. Oxides, sulfates, carbonates and silicates of aluminum, magnesium, barium or calcium are quite commonly used for these separations. Particular adsorbents are siliceous materials such as silicic acid or ground silica or diatomaceous earth, alumina, magnesia, barium sulfate, calcium carbonate, magnesium silicate.

In the case of soft adsorbents such as magnesia, in order to prevent the adsorbent from packing into an impermeable bed, it is preferred to include a rigid porous glass which may comprise a substantial portion of the total adsorbent, suitably from 30 to 90% by weight. Reagents or indicators may be compounded directly into the adsorbent. A typical example of preparing an adsorbent follows:

EXAMPLE 1

(a) Corning high purity porous glass—Code 7936 with alumina binder and UV indicator;
(b) Silica plain gel—Catalog 8076-1 (Warner-Chilcott); and
(c) Magnesium silicate—AICCO SOL PG (Allegheny Industrial Chemical Co.);

were mixed in weight percentages of 88.6:5.7:5.7 in the order a:b:c. About 150 gm. of this mixture was placed in a one liter glass-stoppered borosilicate glass reagent bottle together with 400 ml. of chloroform and 2 sizes of grinding media: 80 porcelain cylindrical grinding pebbles ½ in. O.D. x ½ in. long and 24 spheres, ¾ inch in diameter. The charge was then milled at a rate of 48 r.p.m. for 16 hours, the solvent filtered off and the adsorbent dried for 8 hours in an oven at 110° C. The adsorbent was then sieved to the proper particle size cuts through Buckbee-Mears microsieves by holding the sieve stack on the table of a magnetically driven vibrating table.

Further in accordance with the invention a technique has been developed for efficiently mass-producing the micro-columns of this invention. The general steps of the technique comprise:

Plugging one end of a tubular member having an internal bore of the desired volume;
disposing at least one of the plugged members, plug end down in a near vertical position in a larger container;
feeding dispersed, separated particles of adsorbent into the container while vibrating the container;
continuing feeding the patricles to a level above the open end of the member;
compacting the charge of particles until no further change of level is indicated;
removing the micro-columns from the charge; and
plugging the other end of the member.

Figure 2:
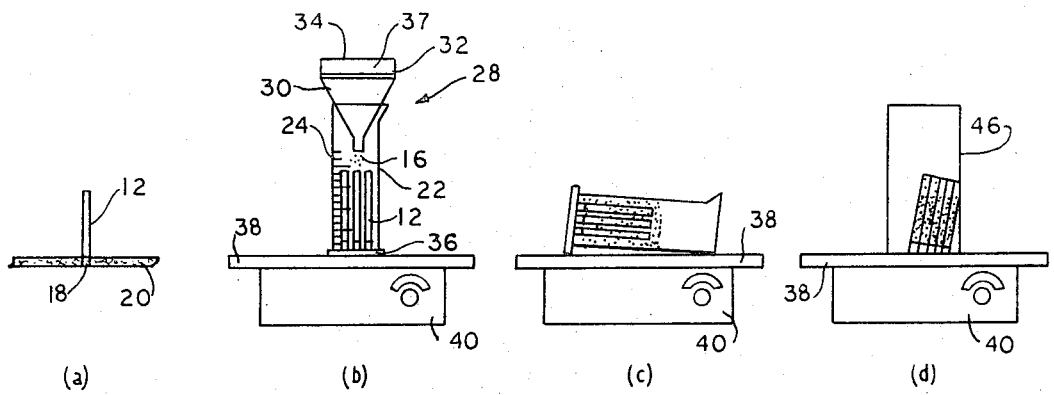
FIG. 2 is a schematic train of steps illustrating the preparation of a batch of columns.

Referring now to FIG. 2, a schematic train of apparatus suitable for fabricating a batch of fifty 25 $\mu$l. micro-columns is illustrated. In step 2(a), a plug 18 is bored from a 1 mm. thick mat 20 of Fiberfrax ceramic paper, Type 970–H (Carborundum Co.) without binder utilizing a 25 $\mu$l. pipette 12 as a plug borer. This paper is also available in 0.5 to 2 mm. thicknesses depending on the volume of sample to be imbibed into the micro-column.

In step 2(b), the plugged members 12 are dropped plug end down into a cylinder 22 preferably transparent and containing visible volumetric graduations 24. The diameter of the cylinder is selected to be just slightly larger than a circular bundle of the batch of tubular members such that each member or pipette stand in the cylinder in a nearly vertical position. A–10 $\mu$l. graduate about 1 cm. I.D. is convenient for 50 columns of the 25 $\mu$l. size. A particle feeder 28 is assembled on the open end of the cylinder 22 and comprises a 60° conical glass funnel 30 (7 cm. in diameter with a stem length of about 2–3 cm.) covered with a Buckbee-Mears sieve 32 of 7.4 cm. grid diameter and which is further enclosed by a sieve cover 34. The base 36 of the cylindrical graduate 22 is secured to the table 38 of a variable drive vibrating device 40 suitably a Model J–1A Paper Jogegr (Syntron Co.).

The sieve 32 is charged with a batch 37 of adsorbent particles which has previously passed through it during preparation of the cut. The cover 34 is applied and the vibrating device 40 is energized at a power setting which causes the funnel sieve cover particle feeder assembly 28 to vibrate freely, thus permitting the adsorbent particles 16 to sift as free particles into the cylinder 22 and enter the tubular members 12. The sifting operation is preferably carried out in a fume hood in order to minimize exposure of personel to the fine adsorbent smoke created during this operation. A Unisil cut if —45/+20$\mu$ was utilized for the 25 $\mu$l. columns and a —20 $\mu$ sieved adsorbent for the 1-$\mu$l. columns with the paper jogger at a power setting of 4.0.

The adsorbent is sifted in until the cylinder is filled to a height 1–2 cm. above the open end of the tubular members 12. The particle feeder is then removed. The cylinder is then jogged for about a minute at an energy level sufficient to fluidize the bed of adsorbent, usually at a power setting of 6–8. This procedure frees the columns of entrapped air. After the "fluidization" the setting on the vibrating device is reduced to a setting of about 4.5 to pack the bed to its maximum density. Vibration is continued until no further change in bed volume is indicated on the graduations 24.

In step (c) the filled columns are removed from the cylinder 22 by laying the cylinder 22 horizontally on the deck of table 38 and jogged gently (at a power setting of 1–2) to loosen the columns from the surrounding tightly packed bed 44 of adsorbent without significantly emptying the columns. The loosened particles of adsorbent is poured out of the top of the cylinder 22 and the jogging pouring operation is repeated until the columns buried at the bottom of bed 44 can be removed. This operation results in very little adsorbent being lost from the columns.

In step 2(d) the adsorbent is packed tighter to ensure the absence of voids. This is accomplished by vibrating the columns in a container large enough to permit the columns in a container large enough to permit the columns to bounce and dance. The bundle of packed tubular members 12 are placed, plug end down in a second cylinder 46 which is large enough to enable each of the members 12 to move freely when the cylinder is jogged. If a batch of fifty 25 μl. columns 12 are placed in a 25 μl. graduate of about 2 cm. I.D., they lean against the wall at an angle of 77° from the vertical. The cylinder 46 loosely filled with the tubular members 12, is centered on the table 38 and vibrated at a setting to cause the members 12 to dance in a circular pattern in the plane of the deck as they are jogged up and down.

In about 5 minutes this treatment packs the adsorbents to a void-free maximum density. For example, Unisil of $-45/+20\mu$ sieve size had a bulk density of 0.41 g./μl. which was increased to 0.62 g.μl. by this treatment. Before the dancing treatment the columns were full (63 mm. of bed) but the bed was only 57 mm. after dancing leaving 6 mm. of the column empty. Step 2(a) was now repeated to apply a second plug 18 to the open end of the members to form the finished column.

Chromatographic separations generally follow the practice of TLC. Activation or deactivation practiced depending on characteristics of the compounds to be separated. Deactivation is generally practiced when separating materials having strong hydrogen bonding such as phenols. Activation can be effected by heating batches of the columns at 110° C. for an hour, then cooling them in a dessicator over calcium chloride at a RH of 31%. The columns are deactivated by allowing a given column to equilibrate in a stoppered shell vial with a strip of filter paper soaked in the chromatographic solvent to be utilized.

Figure 3:
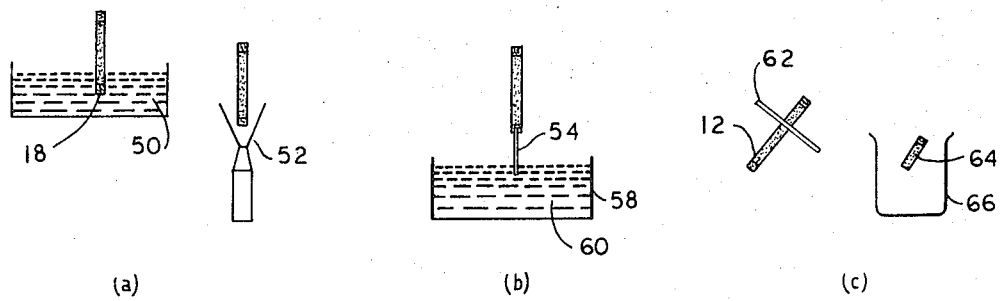
FIG. 3 is a schematic train of steps illustrating analysis utilizing the columns according to the invention.

The analysis procedure includes the steps of sample imbibition, solvent development, band separaion and analysis. A schematic procedure is illustrated in FIG. 3. In step 3(a) the sample is applied to the column.

For qualitative studies, as for multiple tests of sample homogeneity, the plug 18 is dipped into the sample solution 50 then held for a few seconds in a gas stream 52 to evaporate the solvent. A 25-μl. column Fiberfrax plug 18, 2 mm. long will imbibe 0.4–0.5 μl. of solvent. The dipping-evaporation step can be repeated as often as is required to apply a proper load to the column. The availability of the different thicknesses of Fiberfrax mat enables one to choose a plug thickness which will imbibe more or less sample. During solvent evaporation about 20–30% of the solute is left outside the plug on the rim of the column. For exact studies this excess can be removed with ceramic paper and the sample residue and column weighed on a microbalance, such as the Cahn gram balance (Cahn Instrument Co.).

For example, a Unisil-packed 25-μl. column weighs about 73.8 mg. of which 13.4 mg. is adsorbent and with a similar column used as a counterweight one can accurately weigh applied samples to the nearest microgram. One can thus separate 50 μg. of the very difficult to separate mixture of N-(p - dimethylaminophenyl)-1,4-naphthoquinoneimine and p-dimethylaminoazobenzene on a 25-μl. Unisil column with benzene as the eluent. Generally, the load which may be resolved by a column is proportional to its cross-sectional area and thus the 1-μl. column should carry about 1/13 the load that the 25-μl. column can carry. However, a 1-μl. column of bed height 28 mm. (wt. 20.6 mg.) contains only 0.5 mg. of adsorbent and its bed height is only about half that of the 25-μl. column. Thus, the practical load for a 1-μl column must be only about 1/50 (or less) that of the "large" column.

Development is illustrated in FIG. 3(b). After the sample is loaded on the plug 18, the plug 18 is pushed into firm contact with the bed. This is done with the aid of 1-μl. pipette 54 which then becomes a wick which is dipped into a container 58 of development solvent 60. It may be necessary to ensure firm contact of the bed and wick by tapping the assembly gently on the bench top.

The wicks are conveniently held and handled in a wick holder. The wick holder is made as follows: No. 24 gauge T–2X heat-shrinkable Teflon tubing (Penntube Plastics Co.), is heated on a soldering iron, then drawn down to a loose force-fit for the 1-μl. wick. A piece of the tubing 2.2 cm. long including restriction is shrunken onto a pierced bifurcated soldering lug. This assembly may easily be handled and the wick replaced with a clean one, if necessary. The wick for the 1-μl. columns is made from No. 34 gauge steel needle stock (0.007 inch O.D. x 0.003 inch I.D.). This full-hard temper tubing is cut by first folding it under a razor edge across a block of tool steel when bending it across the score with tweezers until it breaks. The steel wick is best used without a "wick assmebly."

In FIG. 3(c) the column 12 is notched with a diamond scribe 62 and broken into segments 64 corresponding to separated bands of sample constituent. The segments 64 are placed in the sample cup 66 of an analytical instrument such as a mass spectrometer.

The conventional techniques for visualization of colorless species are handicapped by their lack of sensitivity at the submicrogram level. This applies also to the absorbents which contain fluorescent indicators, such as Corning Code 7936 glass. If readily sublimable reagents (e.g. iodine, tetracyanoethylene) are used, the column must first be freed of solvent by rapid evaporation in a vacuum. This causes band broadening which in itself is undesirable. Furthermore, if polar solvents have been used the solvent removal process is incomplete under conditions that do not affect the component under investigation.

Therefore, the detection and identification by instrumental techniques is to be preferred. In the list of available techniques, mass spectrometry proves to be by far the most suitable due to its high sensitivity and specificity. Less than 0.01 ng. can readily be detected and identified.

After development, the column is immediately broken into equal sized small sections which are subsequently introduced into the mass spectrometer via a direct insertion inlet system. Normally, the samples are analyzed at a relatively low resolution of $M/\Delta M \approx 2.000$ which allows only limited mass measurement. Nevertheless, this is sufficient for identification of the majority of the bands. If required, the sample can be rerun, since only a very small amount of sample and time are consumed. This permits the analyzer to cut out a specific, still unidentified band and investigate it under conditions of high resolving power $M/\Delta M > 10,000$ and make an identification after precise mass measurement of all peaks of the spectrum.

The mass spectrometer employed in these experiments is an AEI Type MS–902 double focusing instrument fitted with a direct insertion probe for introduction of solid samples. The probe was modified to handle the microcolumn sections directly and to provide independent temperature control of the sample. Limits of detection and identification are 0.01 μg. or less at a resolving power of less than 2000 and 0.1 to 1.0 μg. at a resolving power of 10,000–20,000. The simple presence of a band can be detected below the 10 ng. level.

The column is first scored with a diamond scribe, as shown in FIG. 3c. It is then broken in the mass spectrograph solid-sample probe cup with the aid of a counterbored adapter which slips over the top of the cup. The cups can be stored in the dark under an inert atmosphere at low temperature in large numbers until needed for analysis. Particular experiments follow.

EXAMPLE 2

A mixture of azulene, hydrocortisone, 17-β-estradiol, and estriol were separated on a 25 μl. column of the mixed (glass carrier) adsorbent in the system chloroform-methanol-water 188:12:1 (v./v.) with a development time of 8.00 minutes. About 1 μg. of each compound was loaded on the column by the dip-evaporation method. The column bed which was 5.7 mm. long was broken into 7 pieces 5 mm. long and 2 pieces 10 mm. long, the long pieces at the origin. The pieces were inserted into the mass spectrometer by means of the solid inlet probe and the analysis of the segments showed that the compounds had been cleanly separated on the column. It also showed that the cholesterol sample used contained cholestane contaminant.

EXAMPLE 3

A mixture of water-soluble bacterial stain dyes were well separated on both 25-μl. and 1-μl. columns of Corning Code 7936 glass alone. A total of 1 μg. of each dye was loaded by dipping and separated in the system benzene-methanol-acetone-diethylether 4:2:1 (v./v.). The porous glass columns were activated by heating at 120° C. for 30 minutes, then equilibrated over saturated calcium chloride solution (RH 31%). Development time was 12.05 minutes for the large and 2.00 minutes for the small column. The dyes were: erythrosine B (C.I. 45430), crystal violet (C.I. 42555), rose bengal (C.I. 779), Nile blue A (C.I. 51180), Auramine O (C.I. 41000), brilliant green (C.I. 42040), acridine orange (C.I. 46005) and methyl violet 2B (C.I. 42535).

EXAMPLE 4

A whole acetone extract of *Chorella pyrenoidosa*, strain 71105, was chromatographed on a 25-μl. column of the mixed (glass carrier) adsorbent in the system petroleum ether (30°/60°)-acetone-chloroform 5:5:4 in 8.83 minutes. Carotene, lutein, violaxathin, pheophytins a and b, and chlorophyll a and b were cleanly separated and characterized in the total applied sample of 2.5 μg.

The use of this and related methods has been restricted in the past chiefly to noninstrumented studies of inorganic mixtures. However, one of the principal uses of the micro-columns of this invention value is that of an adjunct to instrumental methods. Used this way, microcolumn are superior to TLC in terms of economy in time of preparation and manipulation as well as in protection of labile mixtures from oxidation. It would be an advantageous substitute of TLC in microclinical applications, such as the separation of urinary coricosteroids.

It is to be understood that only preferred embodiments of the invention have been described and that numerous substitutions, modifications and alterations are all permissible without departing from the spirit and scope of the invention as defined in the following claims.

What is claimed is:

1. A chromatographic analysis device for separating microliter-sized samples comprising in combination:
   a tubular support element formed of a transparent, frangible material, having a smooth and uniform internal bore having an internal diameter below 5 millimeters and a length to internal diameter ratio of no less than 20:1,
   a column having a volume sufficient to adsorb no more than 100 micrograms of liquid sample, formed of void-free, compacted chromatographic adsorbent particles selected from the groups consisting of organic resin, inorganic acids, salts and oxides, said particles having an average diameter no more than 1:100th of said internal diameter and a narrow size range varying no more than 25 microns from said average disposed within the bore of said element; and
   a plug impervious to said adsorbent permeable to liquid and having a volume sufficient to absorb said liquid sample received into at least one end of the bore of said element.

2. A device according to claim 1 in which the material is glass.

3. A device according to claim 1 in which the plug is formed from felted ceramic fibers.

4. A device according to claim 1 in which the adsorbent is selected from the group consisting of silicates, oxides, sulfates and carbonates of aluminum, magnesium, barium and calcium.

5. A device according to claim 1 in which the adsorbent is selected from the group consisting of silicic acid, silica, diatomaceous earth, alumina, magnesia, barium sulfate, calcium carbonate and magnesium silicate.

6. A device according to claim 4 in which the column comprises 10 to 90% by weight of one of rigid porous glass and glass microballoon filler.

7. A method of simultaneously manufacturing a plurality of dry, microliter-sized chromatographic columns comprising the steps of:
   inserting a plug into a first end of a plurality of tubular elements formed of a transparent, frangible material having a smooth internal bore of a diameter below 5 mm., and a length to internal diameter ratio of at least 20:1 and an internal volume of the capacity required for the desired chromatographic separation;
   placing the elements with the plug end down as a bundle into a first container having a diameter slightly larger than the diameter of the bundle such that the elements are in a near vertical position and filling the elements with dry particles comprising chromatographic adsorbent having an average diameter no more than 1/100 of said internal diameter by slowly feeding the particles into the container to a level above the open second end of the elements;
   compacting the particles into a void-free column within the elements by vibrating the container during said feeding; and
   inserting a plug into the other end of said column, at least one of said end plugs being impervious to said particles and permeable to liquid.

8. A method according to claim 7 in which said liquid permeable plug is formed of felted ceramic fibers and said plug is formed by boring a plug from a sheet of said felted fibers with said element.

9. A method according to claim 8 further comprising the steps of removing the bundle of filled elements from the first container, placing the bundle of elements plug end down in a larger second container and vibrating the second container in a back and forth motion such that the elements traverse a circular pattern across the bottom of said second container to further compact said particles and then boring a second plug from a sheet of felted ceramic fiber into the open, second end of each of said elements.

10. A method of analyzing a microliter-sized sample of material comprising the steps of:
    dissolving the material in a solvent to form a solution;
    imbibing a measured portion of the solution onto a liquid permeable, adsorbent impervious end plug disposed within the end of a microliter-sized, compacted column of dry chromatographic adsorbent capable of adsorbing no more than 100 micrograms of liquid sample contained in an outer, frangible, transparent, tubular element;
    imbibing chromatographic development solvent onto said end plug;
    solvent developing said imbibed material into separation bands within said column;
    breaking the element into lengths of column corresponding to at least one of said separation bands; and
    analyzing said separation band.

11. A method according to claim 10 in which said end plug containing imbibed solution is pushed into firm contact with the column by means of a short length of capillary tubing and said tubing is dipped into chromatographic solvent during said solvent development step.

12. A method according to claim 10 in which said element is formed of transparent material to aid in visual inspection of the void-free condition of said column and to visually locate said separation bands.

13. A method according to claim 12 in which said element is formed of glass and said element is notched at a location corresponding to said band separation and broken at said notch into a segment corresponding approximately to a separation band.

References Cited
UNITED STATES PATENTS 3,440,864   4/1969   Blume _____ 210—198 X JAMES L. De CESARE, Primary Examiner U.S. Cl. X.R.

210—198

UNITED STATES PATENT OFFICE
CERTIFICATE OF CORRECTION

Patent No. 3,692,669      Dated September 19, 1972

Inventor(s) Albert J. Bauman

It is certified that error appears in the above-identified patent and that said Letters Patent are hereby corrected as shown below:

Column 2, line 25, cancel "BRIEF DESCRIPTION OF THE DRAWINGS". Column 2, line 28, insert -- BRIEF DESCRIPTION OF THE DRAWINGS --. Line 11, column 3 should appear as line 25 in column 2. Column 2, line 3, after "available" insert -- and --; line 9, "eaxmple" should read -- example --; line 33, after "illustrating" insert -- an --. Column 4, line 55, "personel" should read -- personnel --; line 56, "if" should read -- of --. Column 5, line 24, after "g." and before "µl, insert -- / --; line 42, "separaion" should read -- separation --. Column 6, line 22, "assmebly" should read -- assembly --. Column 7, line 46, "microcolumn" should read -- micro-columns --.

Signed and sealed this 20th day of March 1973.

(SEAL)
Attest:

EDWARD M. FLETCHER, JR.       ROBERT GOTTSCHALK
Attesting Officer       Commissioner of Patents